US005346272A

United States Patent [19]

Priest et al.

[11] Patent Number: 5,346,272

[45] Date of Patent: Sep. 13, 1994

[54] DOOR HINGE WITH INFINITELY ADJUSTABLE DETENT

[75] Inventors: William L. Priest, Sterling Height; Gary D. Bree, Clarkston; David E. Compeau, Oxford, all of Mich.

[73] Assignee: General Motors Corporation, Detroit, Mich.

[21] Appl. No.: 73,212

[22] Filed: Jun. 7, 1993

[51] Int. Cl.[5] .......... B60J 5/00

[52] U.S. Cl. .......... 296/146.11; 16/82; 16/320

[58] Field of Search .......... 296/146.11; 49/138; 16/320, 82

[56] References Cited

U.S. PATENT DOCUMENTS

| | | | |
|---|---|---|---|
| 1,701,202 | 2/1929 | Dudley | 16/82 |
| 2,079,054 | 5/1937 | Vadasz | 16/82 X |
| 3,965,531 | 6/1976 | Fox et al. | 16/338 |

*Primary Examiner*—Dennis H. Pedder

*Attorney, Agent, or Firm*—Anthony L. Simon

[57] ABSTRACT

A method and apparatus of selectively applying a holding force to a vehicle door hinge, comprises the steps of (i) determining when a vehicle door is open and, when the vehicle door is open, thereafter (ii) sensing door movement to determine if the door has remained substantially stationary in an open position for a predetermined time period, (iii) if the door has remained stationary in an open position for a predetermined time period, activating a braking mechanism to provide a holding force for the door, (iv) if the braking mechanism is activated, determining if the door has moved a predetermined distance since activating the braking mechanism, (v) if the door has moved a predetermined distance since activating the braking mechanism, deactivating the braking mechanism, (vi) sensing whether the door is closed, and (vii) if the door is closed, deactivating the braking mechanism.

9 Claims, 3 Drawing Sheets

DOOR HINGE WITH INFINITELY ADJUSTABLE DETENT

This invention relates to a vehicle door hinge detente mechanism and method.

BACKGROUND OF THE INVENTION

Conventional vehicle door hinges have mechanical spring detente mechanisms that provide holding force for the vehicle door when the door is open at select positions. According to typical detente mechanisms, the door must be in one of a few select positions in order to have a detente holding force. When the door is not in one of the few select positions, no holding force is provided.

SUMMARY OF THE PRESENT INVENTION

Advantageously, the method and apparatus of this invention provide a vehicle car door with infinite number of detente holding positions. Advantageously, this invention provides a vehicle car door with a hinge coupled to an electromagnetic brake, which electromagnetic brake activates in any position when the vehicle car door is held in that position for a predetermined period of time. Advantageously, this invention provides an electromagnetic brake for a vehicle door hinge that automatically releases when the door is moved from the detente holding position.

Advantageously, the apparatus of this invention comprises a vehicle having a body, a vehicle door and a vehicle door hinge, means for mechanically coupling the vehicle door hinge to an electric braking mechanism, means for sensing whether or not a vehicle door is opened and whether or not the vehicle door has been in the stationary position for a predetermined amount of time and means for activating the electromagnetic brake in response to the determination that the vehicle door has been in one position for a predetermined amount of time, thereby providing a holding force to the vehicle door in the one position.

Advantageously, the method of controlling an electric door hinge device according to this invention comprises the steps of (i) determining when a vehicle door is open, and, when the vehicle door is open, thereafter (ii) sensing door movement to determine if the door has remained substantially stationary in an open position for a predetermined time period, (iii) if the door has remained stationary in an open position for the predetermined time period, activating an electromagnetic braking mechanism to provide a holding force for the door, (iv) if the electromagnetic braking mechanism is activated, determining if the door has moved a predetermined distance since activating the electromagnetic braking mechanism, (v) if the door has moved a predetermined distance since activating the electromagnetic braking mechanism, deactivating the electromagnetic braking mechanism, (vi) sensing whether the door is closed, and (vii) if the door is closed, deactivating the system.

A more detailed description of this invention is set forth below.

DETAILED DESCRIPTION OF THE INVENTION

Figure 1:
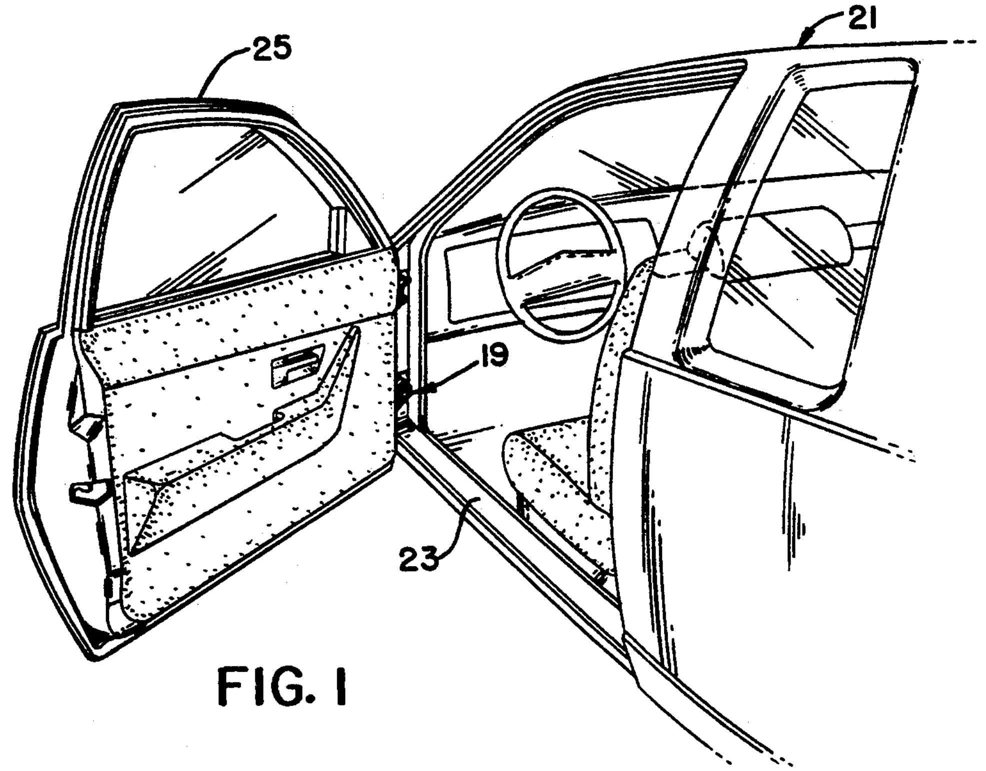
FIG. 1 illustrates a vehicle according to this invention.

Referring to FIG. 1, a vehicle 21 according to this invention has a vehicle body 23, to which is mounted hinge apparatus 19 according to this invention. The vehicle door 25 is hung on the hinge 19 and has an infinite number of detente positions according to this invention as described below. All of the other doors on the vehicle (not specifically referenced), including hatch and trunk doors, may also be hung on hinges 19 according to this invention.

Figure 2:
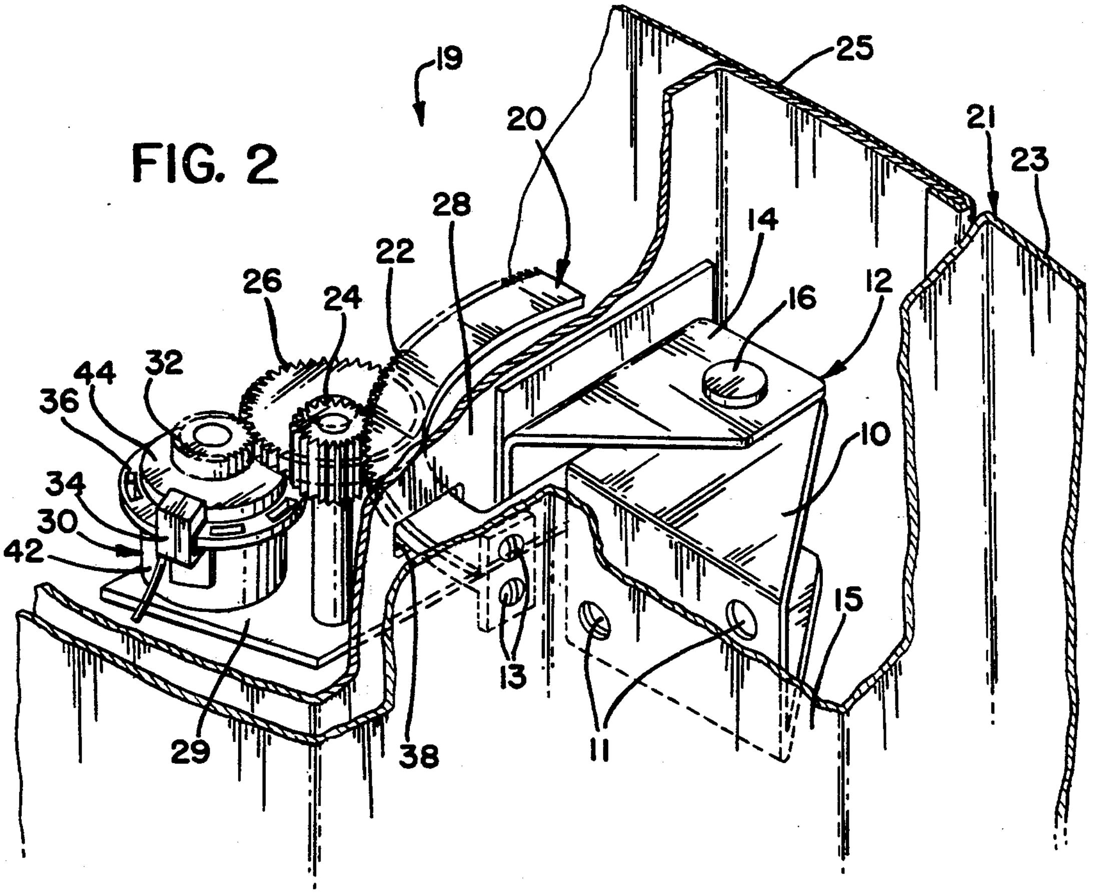
FIG. 2 illustrates a door hinge mechanism including an electric brake according to this invention.

Referring to FIG. 2, the apparatus of this invention comprises door hinge 12, sector gear 22 on arcuate extension 20 from the door hinge 12, idle gears 24 and 26, electromagnetic brake 30 and sensor assembly 34. The control module is described further below with reference to FIGS. 3 and 4.

The door hinge 12 comprises fixed body portion 10, mounted to body panel 15 at mounting holes 11 in a manner well known to those skilled in the art. Pivoting member 14 is pivotally mounted to fixed body portion 10 by pin 16 in a manner well known to those skilled in the art so that pivoting member 14 pivots with respect to portion 10. The door 25 is mounted to pivoting member 14 and is allowed to open and close through the pivoting action of the hinge.

Sector gear 22 comprises part of arcuate extension 20 mounted to the vehicle body at mounting holes 13 by any suitable manner such as mounting screws or bolts and extends through opening 38 in door panel 28 into the inner portion of the vehicle door. Sector gear 22 has teeth that mesh with idle gear 24, which in turn meshes with idle gear 26, which in turn meshes with axle gear 32 of electromagnetic brake 30.

Electromagnetic brake 30 may comprise an electromagnetic clutch of a type readily available to those skilled in the art. Such clutches of the type used as electromagnetic brake 30 generally have two bodies operatively associated as follows. When the clutch is not activated, the first and second bodies 44 and 42 are freely rotatable with respect to each other. When the clutch is activated, a holding force prevents the first and second bodies 44, 42 from rotating with respect to each other unless this holding force is overcome.

In the implementation of electromagnetic brake 30 according to this invention, the second body 42 is fixedly mounted to a mounting plate 29 within the vehicle door 25. When the clutch is not activated, first body 44, to which is mounted the interrupter disc 36 and axle gear 32, is free to rotate, allowing the door 25 to pivot without a holding force from electromagnetic brake 30. When the clutch is activated, a holding force operates to retain first body 44 fixed with respect to the fixedly mounted second body 42. This provides the detente force for the door. The holding force of the clutch can be overcome by an operator moving vehicle door 25.

The size of electromagnetic brake and the amount of force required of the brake will very from implementation to implementation with the size and weight of the vehicle door 25, and the overall gear ratio of the gears 22, 24, 26 and 32. The size of the electromagnetic brake 30 and the gearing ratio of the gears can be easily determined by one skilled in the art to provide a desired holding force for the particular implementation. In an example implementation, electromagnetic brake 30 provides 15 inch pounds of torque, and 5 pounds of holding force at the door edge furthest from hinge 19.

Interrupter disc 36 is of a type readily available to those skilled in the art for use with optical sensors and is fixedly mounted to first body 44 in any suitable manner. Sensor assembly 34 is an optical sensor of a type readily available to those skilled in the art, and, in general, provides high and low output signals as the slotted and solid portions, respectively, of interrupter disk 36 pass through the sensor 34.

In response to movement of the door 25, idle gear 24 travels along sector gear 22, in turn causing rotation of gear 26 and rotation of body 44 of electromagnetic brake 30 via gear 32. As body 44 rotates, slotted interrupted disc 36 passes a series of slots and solid portions through the optical sensor of sensor assembly 34, enabling sensor assembly 34 to sense movement of door 25 with respect to the vehicle body 23. The slotted interrupter discs and sensor assembly provide a signal to the control module described below indicating that the door is moving.

When the door stops moving, the control module, after a predetermined time, activates electromagnetic brake 30 to provide a holding force on gear 32, which holding force is transferred to the door hinge 12 via idle gears 24 and 26 and sector gear 22, to act on the door hinge similar to a detente force. When a vehicle operator moves the vehicle door 25 with enough force to overcome the detente-like holding force, sector gear 22 and idle gears 24 and 26 cause rotation of gear 32 and first portion 44 of electromagnetic brake 30, in turn, causing rotation of the slotted interrupted disc 36. The movement of slotted interrupter disc 36 is sensed by the control module via sensor assembly 34. In response to the sensed movement, the control module deactivates the electromagnetic brake until the door again stops moving for the predetermined time period, at which point, unless the door is closed, the electromagnetic brake is again activated.

A plastic housing and cover (not shown) may be provided to fit over the gears and electromagnetic brake to provide protection for dust and debris. The plastic housing may be suitably molded to help retain the shafts of idle gears 24 and 26 in place.

In the above manner, the electromagnetic brake can be activated at any position in which the door is retained for a predetermined period of time, providing an infinite number of detente positions for the full range of open positions of the vehicle door.

Figure 3:
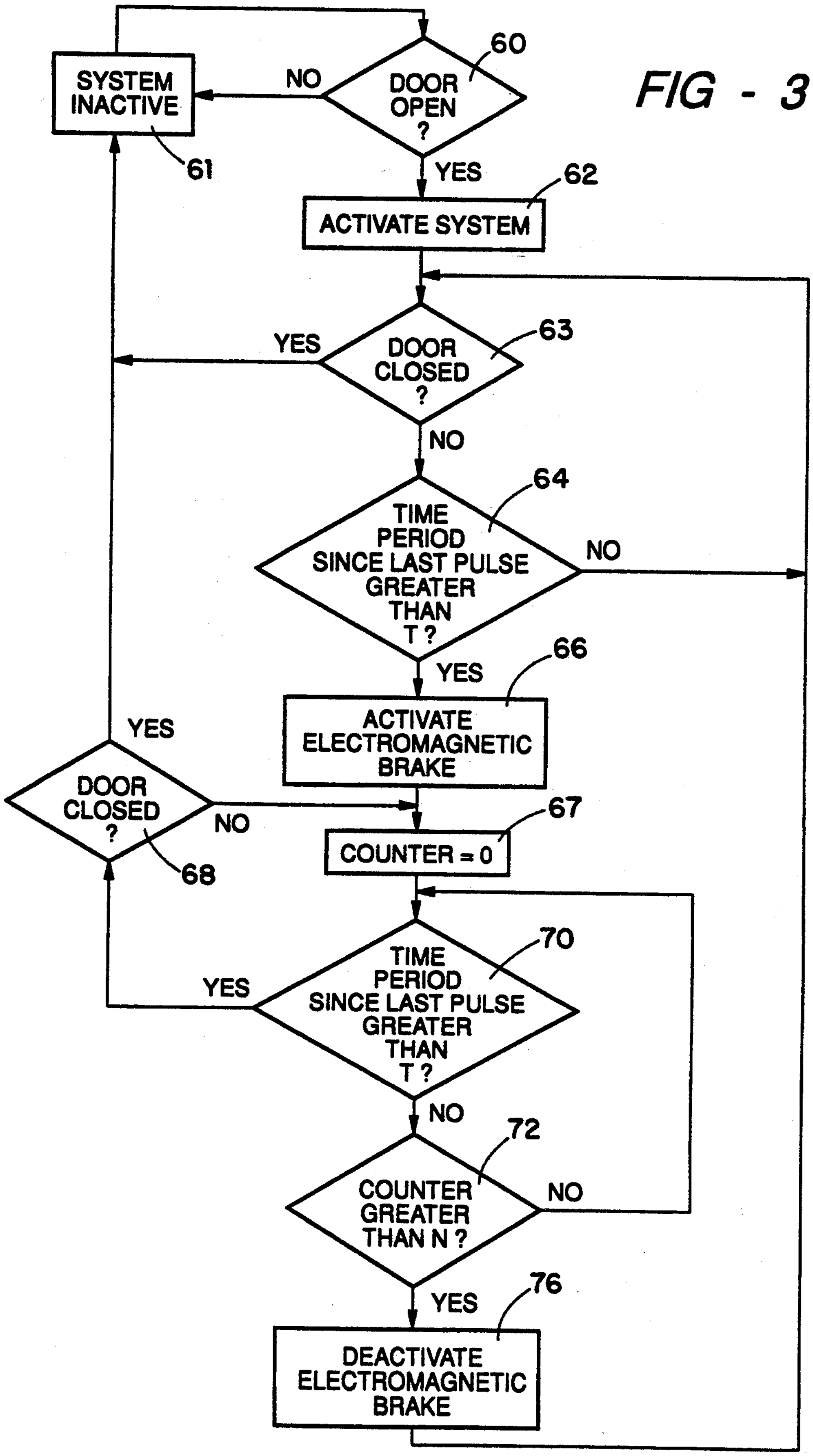
FIG. 3 comprises a flow diagram illustrating the method of this invention.

An example operating method for the electromagnetic brake apparatus of this invention is illustrated in the flow diagram in FIG. 3, which starts at step 60. At step 60, the method determines if the vehicle door is open. If the vehicle door is not open, step 61 retains the electromagnetic system inactive. If the vehicle door is open, i.e., as sensed by a door-ajar switch, step 62 activates the electromagnetic brake system of this invention.

Step 63 then determines if the vehicle door has again been closed. If so, step 61 deactivates the system and step 60 again checks to determine if the door has been opened again. If the door has not been closed, step 64 receives the signals indicative of door movement, i.e., the pulse signals from sensor 34, and determines if the door has stopped moving by timing the period between each two consecutive signals. Each time that it is determined that the door is still moving, which determination is made by two consecutive signals occurring within a predetermined time period T (i.e., T=500 ms), the method returns to step 63.

If no two signals are within the predetermined time period T, the method determines that the door is not moving and activates the electromagnetic brake 66 to provide a detente-like holding force on the door. A counter is enabled and reset to zero at step 67 and step 70 again checks for door movement by timing the period between consecutive signals from the sensor. If there has been no movement for the predetermined time period T, step 68 checks to determine if the door is closed. If so, the system is deactivated at step 61. Otherwise the counter is reset to zero at step 67.

Steps 70 and 72 determine if the door is moving and if the door has moved a predetermined distance. Determination of the door moving is made at step 70 by the receipt of consecutive pulses from the sensor within the time period T. The counter is incremented with each pulse and determines the distance of travel by counting the pulses, spaced apart by a time period no greater than time T. Step 72 compares the number of pulses to a predetermined value N, which may correspond, for example, to the number of pulses received when the outer edge of the door 25 moves an inch. When the number of pulses reaches N, the method assumes that an operator is attempting to move the door out of detente, and step 76 deactivates the electromagnetic brake. The method then returns to step 63 described above.

If the number of pulses counted by the counter is not equal to N, the method returns to step 70 where it either continues counting pulses or, if no pulses are received for the predetermined time period T, moves to steps 68 and 67.

Figure 4:
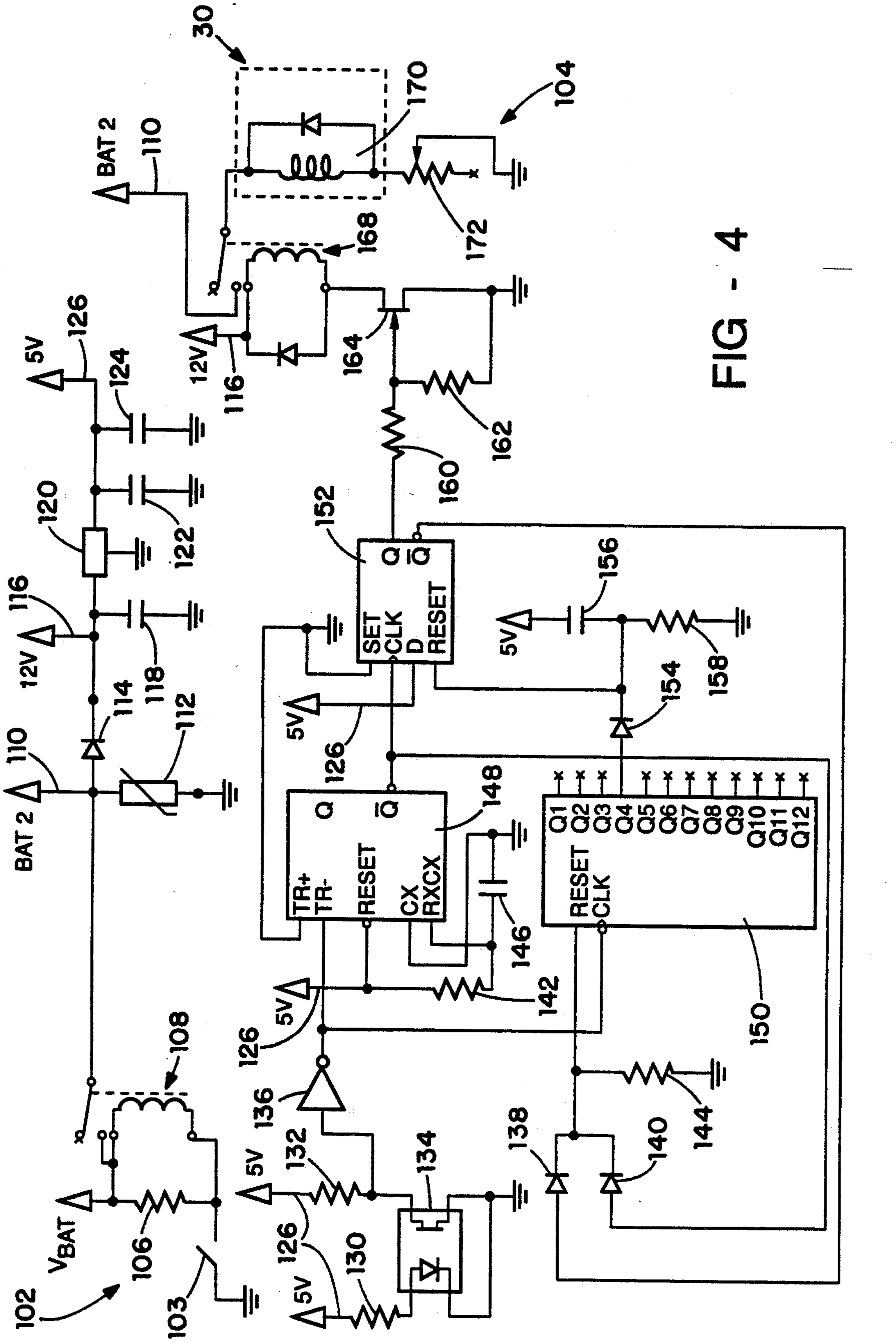
FIG. 4 is a schematic circuit diagram of a control circuit for the apparatus of this invention.

Referring to FIG. 4, an example control module according to this invention comprises on/off circuit 102 and electromagnetic brake control circuit 104. On/off circuit 102 comprises a door-ajar switch 103, which closes when the vehicle door is opened. The closing of the switch 103 activates relay 108 connected across resistor 106 between the vehicle voltage supply line and switch 103. In response, the relay switch of relay 108 closes, providing power from the vehicle battery voltage supply to line 110. Line 110 is clamped by metal oxide varistor 112 to approximately 13 volts. Diode 114 couples line 110 to line 116. Capacitor 118 stabilizes line 116 and attenuates high frequency voltage fluctuations. Voltage regulator circuit 120 receives power from line 116 and provides a 5 volt regulated power supply on line 126, which line is stabilized by capacitors 122 and 124.

On/off circuit 102 switchably controls power to activate control circuit 104 when the vehicle door is ajar and to deactivate control circuit 104 by cutting the supplied power when the vehicle door is closed. Line 110 provides power to the electromagnetic brake when activated by control circuit 104. Line 116 powers the relay 168 that actively switches on and off electromagnetic brake 30 in response to the control commands provided to transistor 164. Line 126 provides power to the remainder of control circuit 104.

When control circuit 104 is first powered-up, D flip-flop 152 is held at reset for a time period determined by the charging of capacitor 156 through resistor 158, i.e., approximately 10 milliseconds, to allow the rest of the circuit to stabilize.

Optical photo interrupter 134, within sensor 34, senses movement of the door between various open positions. Optical photo interrupter 134 includes an internal diode powered from line 126 via resistor 130 and a photo transistor whose signal is interrupted by the slots in the interrupter disc in the electromagnetic brake. As the door is moved between various positions, optical interrupter 134 provides output pulses via resistor 132 and inverter 136 to retriggerable one-shot 148.

The first pulse from optical photo interrupter 134 causes the Q output of one-shot 148 to go high and the Q bar output of one-shot 148 to go low. The Q bar stays low for 500 milliseconds unless another pulse retriggers one-shot 148. The 500 millisecond time-out for one-shot 148 is controlled by resistor 142 (500K) and capacitor 146 (1 $\mu$F). The time-out period can be varied by changing the value of the resistor 142. The 500 ms time-out is the predetermined period, T, in blocks 64 and 70 described above with respect to FIG. 3.

When the door stops moving, one-shot 148 does not receive a pulse for 500 milliseconds, causing the Q output to go back low and the Q bar output to go back high. This low-to-high transition clocks the D flip-flop 152. Since the D input of flip-flop 152 is tied to logic high, the Q output of flip-flop 152 goes high, turning on relay 168 via transistor 164 and resistors 160 and 162. When relay 168 is activated, battery power is provided from line 110 to electromagnetic brake circuit 170, represented as an inductor and a free-wheeling diode coupled between the relay 168 and potentiometer 172, which is coupled to ground. In this mode, electromagnetic brake is activated and provides a holding force on the door hinge, tending to maintain the door at the current door position. The holding force is adjusted by varying potentiometer 172 to control the flow of current through electromagnetic brake circuit 170.

When the Q output of flip-flop 152 goes high, the Q bar output goes low coupling the low signal via diode 138 to the reset of binary counter 150, which input is coupled to ground by resistor 144. Binary counter 150 must also receive a low signal from the Q bar output of one-shot 148 via diode 140 to be enabled. Thus, counter 150 is enabled only when (i) the electromagnetic brake is on and (ii) pulses are being received from optical photo interrupter 134 less than 500 milliseconds apart.

When the binary counter 150 receives 8 pulses, no two of which are 500 milliseconds or more apart, indicating that the door is moving and has moved for a predetermined angular distance, output Q-4 of counter 150 goes high. This resets a D flip-flop 152 via diode 154, causing the Q output of flip-flop 152 to go low, turning off the electromagnetic brake 170 by deactivating relay 168 via transistor 164.

The door is now free to move until the circuit receives no pulses for 500 milliseconds or until the door is closed. When the door is closed, the door ajar switch 103 is open, removing all power from the control module. If the door is open and stops moving for 500 milliseconds or longer, the electromagnetic brake is turned back on until the door moves another predetermined distance providing an 8 counts to counter 150 with no two counts more than 500 milliseconds apart. After counter 150 receives the 8 counts, no two of which are 500 ms apart, the electromagnetic brake is again turned off.

Since the above described system can activate the electromagnetic brake in any door-open position, there are an infinite number of "detente" positions of the vehicle.

The above described implementation of this invention is an example implementation and is not limiting on the scope of this invention. Moreover, various other improvements and modifications to this invention may occur to those skilled in the art and such improvements and modifications will fall within the scope of this invention as set forth below.

The embodiments of the invention in which an exclusive property or privilege is claimed are defined as follows:

1. A vehicle comprising:

a vehicle body;

a hinge mounted to the vehicle body;

a vehicle door hung on the hinge and pivotable with respect to the vehicle body, allowing the door to open and closed;

means for mechanically coupling the vehicle door hinge to an electric braking mechanism first sensing means for determining whether the vehicle door has been in a stationary position for a predetermined amount of time;

means for activating the electric braking mechanism when the first sensing means determines that the vehicle door has been in the stationary position for the predetermined amount of time, thereby providing a holding force to the vehicle door in the stationary position.

2. The apparatus set forth in claim 1, wherein also comprising:

second sensing means for sensing whether the vehicle door is open and for sensing whether the vehicle door is closed; and means responsive to the second sensing means for deactivating the electric braking mechanism when the vehicle door is closed.

3. The apparatus set forth in claim 1, wherein the stationary position may be any one of a set of all possible door open positions.

4. The apparatus set forth in claim 3, wherein there are an infinite number of door open positions.

5. The apparatus set forth in claim 1, wherein the means for mechanically coupling the vehicle door hinge to an electric braking mechanism includes a sector gear and at least one idle gear.

6. The apparatus set forth in claim 2, wherein the second sensing means includes a door-ajar switch.

7. The apparatus set forth in claim 1, wherein the first sensing means includes an optical sensor mounted to the electric braking mechanism.

8. A method of selectively applying a holding force to a vehicle door hinge, comprising the steps of:

(i) determining if a vehicle door is open and, if the vehicle door is open, thereafter;

(ii) sensing movement of the vehicle door to determine if the vehicle door has remained substantially stationary in an open position for a predetermined time period;

(iii) if the vehicle door has remained stationary in the open position for the predetermined time period, activating an electromagnetic braking mechanism to provide a holding force for the door;

(iv) if the electromagnetic braking mechanism is activated, determining if the vehicle door has moved a predetermined distance since activating the braking mechanism;

(v) if the electromagnetic braking mechanism is activated and if the vehicle door has moved the predetermined distance since activating the electromagnetic braking mechanism, deactivating the electromagnetic braking mechanism;

(vi) sensing whether the vehicle door is closed; and (vii) if the vehicle door is closed, deactivating the electromagnetic braking mechanism.

9. A method of selectively applying a holding force to a vehicle door hinge, comprising the steps of:

(i) sensing movement of a vehicle door to determine if the vehicle door has remained substantially stationary in an open position for a predetermined time period;

(ii) if the door has remained stationary in the open position for the predetermined time period, activating an electromagnetic braking mechanism to provide a holding force for the vehicle door;

(iii) if the electromagnetic braking mechanism is activated, determining if the vehicle door has moved a predetermined distance since activating the braking mechanism;

(iv) if the electromagnetic braking mechanism is activated and if the vehicle door has moved a predetermined distance since activating the electromagnetic braking mechanism, deactivating the electromagnetic braking mechanism.

* * * * *